United States Patent [19]

Kuan et al.

[11] 4,436,857
[45] Mar. 13, 1984

[54] COATING RUBBER WITH A COMPOSITION WHICH RESISTS REMOVAL BY WATER

[75] Inventors: Tiong H. Kuan, Stow; John G. Sommer, Hudson, both of Ohio

[73] Assignee: The General Tire & Rubber Company, Akron, Ohio

[21] Appl. No.: 290,637

[22] Filed: Aug. 6, 1981

Related U.S. Application Data

[60] Continuation of Ser. No. 213,433, Dec. 5, 1980, abandoned, which is a continuation of Ser. No. 93,771, Nov. 13, 1979, abandoned, which is a division of Ser. No. 21,380, Mar. 19, 1979, Pat. No. 4,217,395, which is a continuation-in-part of Ser. No. 931,597, Aug. 7, 1978, abandoned.

[51] Int. Cl.³ .............................................. C08K 5/05
[52] U.S. Cl. .................................. 524/260; 524/377; 524/522
[58] Field of Search ................. 524/260, 377, 522; 528/492, 494

[56] References Cited

U.S. PATENT DOCUMENTS

| | | | |
|---|---|---|---|
| 3,484,394 | 12/1969 | Holdstock | 260/3 |
| 3,793,244 | 2/1974 | Megee | 260/29.7 H |
| 3,817,899 | 6/1974 | Turck | 260/29.6 SQ |
| 4,065,423 | 12/1977 | Hen | 260/29.7 H |

*Primary Examiner*—Paul R. Michl

[57] ABSTRACT

A carboxylated polymer latex containing a minor amount by weight of a heat sensitizer sufficient to gel the polymer and which also can contain fillers, wetting agents and stabilizers can be used to provide a water resistant film on the surface of a with rubber compound or composition which subsequently can be cooled rapidly wiht water and dried. The resulting latex coated rubber can then be stacked or assembled without sticking.

5 Claims, No Drawings

COATING RUBBER WITH A COMPOSITION WHICH RESISTS REMOVAL BY WATER

This application is a continuation of Ser. No. 213,433 filed Dec. 5, 1980 abandoned which was a continuation of Ser. No. 093,771 filed Nov. 13, 1979 abandoned which was a division of Ser. No. 021,380 filed Mar. 19, 1979 now U.S. Pat. No. 4,217,395 granted Aug. 12, 1980 which was a continuation-in-part of Ser. No. 931,597 filed Aug. 7, 1978 abandoned. Ser. No. 017,527 filed Mar. 5, 1979 was a division of Ser. No. 931,597 above and was abandoned.

BACKGROUND

In preparing rubber stocks for use they are generally mixed in a Banbury with some or all of the compounding ingredients, and the rubber stock is sheeted on a sheetoff mill and cooled for further use. If it is to be stacked or stored before further handling, it must be dusted or coated with a material like clay to prevent sticking. The output of a Banbury for a particular rubber compound has generally been measured by the time or by the temperature required. It has been found that measurement of the energy consumed by the Banbury by means of a power integrator (Monsanto) gives a better indication of mixing. Mixing of the rubber compound or mix in the Banbury usually results in a large heat build-up with the temperature of the compound increasing to about 90° C., and higher most of the time, even up to at least about 150° C.

Slab dips are used in the tire industry for coating freshly mixed rubber compounds to prevent them from sticking together when piled and shelved for subsequent processing. The installation of power integrators on Banburys significantly reduces the mixing time of rubber stocks, and hence it increases throughput, increases savings or reduces the need for more Banburys or mixing capacity. However, the method of cooling the rubber compounds by forced air (fans) is not adequate generally to accommodate the increased throughput for a given factory space. It requires more than 12 minutes to cool a stock from the Banbury and sheetoff mill with forced air to a desired laydown temperature of about 50° C. maximum, preferably of about 45° C. maximum, to prevent scorch. A cooling system incorporating water spray units between the slab dip tank and the air cooling fans effectively reduces the cooling time to less than 5 minutes. The use of water sprays, however, renders the usual slab dip, a clay dispersion in water, ineffective as it is easily washed away when sprayed with water.

Slab dips usually come in the form of an aqueous suspension or emulsion containing suitable inorganic or organic substances. Most commonly used additives include whiting, clay and/or paraffin wax. The effectiveness of the slab dip depends on the uniformity of the coating deposited on the rubber surface, particularly on drying, and on its resistance to flow or displacement under stress as a result of stacking. Many compositions probably would work if they were dried by air or forced air after deposition on the rubber surface. The requirement of resistance to removal by water spray would limit the number of usable candidates. Zinc stearate slurry in water can be used as a coating. When deposited on the rubber surface, the zinc stearate forms a uniform, anti-sticking film which resists removal by water. However, the cost of zinc stearate even in thin coatings outweighs the benefits resulting from the use of a power integrator on a Banbury.

Accordingly, it is an object of the present invention to overcome the difficulties alluded to hereinabove and to provide a method for coating a hot rubber compound with a coating which resists removal by water, which enables the rubber to be cooled substantially rapidly by water and which enables the cooled rubber to be assembled or stacked without sticking.

These and other objects and advantages of the present invention will become more apparent to those skilled in the art from the following detailed description and working examples.

DISCUSSION OF THE PRIOR ART

U.S. Pat. No. 2,791,519 discloses a lacquer comprising a solution of a copolymer of 40–80% butadiene, 10–50% acrylonitrile, and 2–25% methacrylic acid dissolved in a solvent to be used as a coating for cured or uncured curable rubber compositions to improve the abrasion resistance and gloss of such rubber articles as hose, fuel cells, auto mats, seat covers, shoe soles and uppers and tires. While silica and some compounding ingredients can be added to the lacquer, materials which react with the COOH groups are less suitable. If uncured, the lacquer coating can be removed by a solvent. Example 3 shows application of the lacquer to a curable rubber stock which was vulcanized and shows after curing the removal of the lacquer by a solvent.

U.S. Pat. No. 4,092,279 (O.G. May 30, 1978) shows a coating for treating the outer surface of a rubber article prior to vulcanization comprising an aqueous composition of 2–70% solids of (A) a rubber from a latex (natural, conjugated diene polymers, copolymers of dienes, and copolymers of dienes and styrene, substituted styrene, acrylic and methacrylic acid, esters, nitriles and amides thereof and vinyl pyridine), (B) emulsifying agents, (C) graphite, carbon black or mineral fillers, (D) a thickening agent and (E) casein.

Japanese Patent Specification No. 057625 (May 22, 1974) discloses a process for preventing sticking of rubber sheets or granules together by passing the rubber through a dip tank comprising an aqueous dispersion of 10% light calcium carbonate and 0.2% (rubber solids) of a butadiene-styrene copolymer (latex; 23.5% styrene). The latex, also, can be a polyisoprene, polybutadiene, acrylonitrile-butadiene copolymer or polychloroprene latex (0.1-5 wt. % solids rubber in the dispersion). The filler, also, can be talc, clay, silica or magnesium carbonate and can be present in the dispersion in an amount of 1–30 wt. %.

Japanese Patent Application 51489 (May 8, 1973) discloses a process for the preparation of tack free pellets or strands of uncured rubber (which is tacky at normal temperatures) which comprises coating the same with a thermoplastic polymer having a softening point of 40° to 170° C. The thermoplastic polymer can be applied from solvent or emulsion, should be tack-free at normal temperatures and should be capable of being plasticized or processed by rubber processing machines. The thermoplastic polymer can be polyethylene, polypropylene, their chlorinated polymers, ethylene-propylene copolymers, ethylene-vinyl acetate copolymers, styrene-butadiene block copolymers, trans-1,4-polyisoprene, thermoplastic polyurethanes, thermoplastic polyesters, chlorosulfonated polyethylene, polyvinyl chloride, polyvinylidene chloride and vinyl alcohol type polymers and mixtures thereof. The amount of thermoplastic polymer should be less than 50%, preferably less than 30%, by weight based on the sum of the thermoplastic polymer and the uncured rubber.

"Chemical Abstracts," Vol. 87, 153215v discloses a release agent for unvulcanized rubber. When a milled dispersion comprising 10 parts of powdered coumarone resin, 30 talc, 1.2 magnesium silicate hydrate, 4 nonionic surfactant and 54.8 parts water was sprayed onto unvulcanized butyl rubber sheets at 130°–40° and piled up, the sheets did not stick together.

STATEMENT OF THE INVENTION

According to the present invention it has been found that a carboxylated polymer latex containing a minor amount by weight of a heat sensitizer sufficient to gel the polymer particles of the latex on the application of heat, preferably containing also fillers, stabilizers and wetting agents, can be used, to form an adherent water resistant coating on a hot rubber surface which subsequently can be water cooled, by dipping, preferably by spraying, dried and assembled without danger of the rubber (layers) sticking to itself. The film formed on heat drying resists removal by water spray. Film formation is believed due to the heat from the freshly mixed (milled or worked) rubber. The film is adherent to the rubber and prevents layers of rubber from sticking together. Also, any filler in the rubber latex is effectively bound by the carboxylated polymer on drying so that dusting does not occur to any appreciable extent when a filler is present in the coating. The use of the present process thus provides a method for increasing the production of a Banbury.

DISCUSSION OF DETAILS AND PREFERRED EMBODIMENTS

The carboxylated polymer is prepared by free radical aqueous emulsion copolymerization. It should be capable of forming an essentially non-tacky, essentially water insoluble film when cast as a latex and dried, and the copolymer per se should be sulfur vulcanizable and have a glass transition temperature (Tg) of not less than about $-30°$ C. The copolymer contains (1) at least 45% by weight of styrene, vinyl toluene, acrylonitrile, methacrylonitrile, acrylamide, methacrylamide, methylmethacrylate, or ethyl methacrylate or mixture thereof, (2) up to 10% by weight of a copolymerizable acidic monomer like acrylic acid, methacrylic acid, ethacrylic acid, maleic acid, fumaric acid, itaconic acid, citraconic acid, sorbic acid or crotonic acid or mixture thereof, and (3) the balance a copolymerizable conjugated diene monomer in sufficient amount by weight to afford some flexibility and to provide for vulcanization, crosslinking or curing, e.g., sulfur, or peroxide curing, such as butadiene-1,3, isoprene, 2,3-dimethyl-butadiene-1,3, or piperylene or mixture thereof. Very minor amounts of a 4th, 5th etc., monomer such as methyl acrylate, hydroxy ethyl acrylate, and so forth can be copolymerized with the above monomers so long as these additional monomers do not adversely affect the properties of the resulting copolymer or latex. Methods for making carboxylated polymers are disclosed in U.S. Pat. Nos. 2,604,668; 2,669,550; 2,710,292; 2,724,707; 2,849,426; 2,868,754; 3,392,048; 3,404,116; 3,409,569 and 3,468,833; in "Rubber World," September, 1954, pages 784 to 788; and in "Industrial and Engineering Chemistry," May 1955, pages 1006 to 1012. Mixtures of carboxylated latices may be used. While an ester of the acid or its anhydride etc., can be copolymerized instead of the acid and then hydrolyzed and neutralized to form free acid groups in the copolymer, this procedure is not as convenient as directly copolymerizing the acidic monomer with the other copolymerizable monomers.

Polymerization of the monomers is effected by free-radical catalysts (free-radical formers or free-radical forming systems) such as ammonium, potassium or sodium persulfate, $H_2O_2$ and the like in an amount sufficient for polymerization of the monomers and to obtain the desired molecular weight. Other free-radical catalysts can be used which decompose or become active at the temperature used during polymerization. Examples of some other free-radical catalysts are cumene hydroperoxide, dibenzoyl peroxide, diacetyl peroxide, didecanoyl peroxide, di-t-butyl peroxide, dilauroyl peroxide, bis (p-methoxy benzoyl) peroxide, t-butyl peroxy pivalate, dicumyl peroxide, isopropyl percarbonate, disec-butyl peroxydicarbonate, azobisdimethylvaleronitrile, 2,2'-azobisisobutyronitrile, 2,2'-azobis-2-methylbutyronitrile and 2,2'-azobis (methylisobutyrate) and the like and mixtures of the same. Only minor amounts of catalyst are necessary to effect polymerization. Free-radical catalysis is well known as shown by "Encyclopedia of Polymer Science and Technology," Interscience Publishers a division of John Wiley & Sons, Inc., New York, Vol. 2 (1965) pages 278–295, Vol. 3 (1965) pages 26–29, Vol. 7 (1967) pages 361–431, and Vol. 9 (1968) pages 814–841.

Emulsifiers such as soaps, surfactants or dispersing agents are used in an amount sufficient to obtain an aqueous emulsion of the water and monomers and resulting copolymer. Examples of some emulsifiers are potassium laurate, potassium stearate, potassium oleate, sodium dodecyl sulfonate, sodium decyl sulfate and sodium rosinate and the like and mixture thereof. Other well known surfactants can be used. See, also, "Materials, Compounding Ingredients and Machinery for Rubber," Publ. by "Rubber World", Bill Communications, Inc., New York, 1977, pages 291–294 and "Encyclopedia of Polymer Science and Technology," Vol. 5, 1966.

Chain transfer agents or modifiers are well known in the emulsion copolymerization of vinyl and diene monomers to make copolymers. They are used generally to modify the molecular weight and to reduce cross-linking. While many types have been proposed, it is preferred to use the alkyl and/or aralkyl mercaptans having from 8 to 18 carbon atoms. Of these, the tertiary alkyl mercaptans are much preferred. Examples of some mercaptans are n-octyl mercaptan, n-dodecyl mercaptan, t-octyl mercaptan, t-dodecyl mercaptan, p-tridecyl mercaptan, tetradecyl mercaptan, hexadecyl mercaptan and so forth and mixtures thereof. If little or no mercaptan is used and polymerization is continued to completion, gel may occur and the molecular weight can be very high or infinite although some low m.w. fractions may be found. In other words, m.w. may range from 50,000 to 2,000,000 or more.

NaOH, KOH, $NH_4OH$ and so forth may be added to the polymerization reactor before, during or after polymerization to control the pH as desired. Polymerization may be conducted under acidic conditions.

The water should be free of deleterious materials, and preferably should be distilled or ion exchanged. Sufficient water is used to enable formation of the emulsion and to enable proper mixing or stirring of the ingredients during polymerization to obtain the desired rate and degree of polymerization, heat transfer and so forth. The solids content (after removal of water) of the resulting latex, thus, may vary from about 25 to 60% by weight, and the pH can be from about 7.5 to 11.5.

Stabilizers, antioxidants and chelating agents may be used during polymerization. Also shortstops in free radical polymerization are well known. They are not only used to stop the polymerization in the reactor at the desired conversion but also to prevent further polymerization, cross-linking etc., during stripping, work-up and so forth. Examples of some shortstops are hydroquinone, sodium sulfide, hydroxyl ammonium acid sulfate, hydroxyl ammonium sulfate, sodium diethyl dithiocarbamate, diethylhydroxylamine, sodium dimethyl dithiocarbamate, potassium dimethyl dithiocarbamate, dimethylammonium dimethyldithiocarbamate, hydroxylamine sulfate plus sodium hydrosulfite and so forth.

Temperatures used during polymerization should be sufficient to effect polymerization by activation of the catalyst and double bonds of the monomers. They should not be too high to cause a run-away reaction and not too low to retard polymerization. In general, the temperature may be from about 2° to 90° C. If even lower temperatures are used, it may be desirable to add an anti-freeze material to the polymerization media such as methyl alcohol, ethyl alcohol, propyl alcohol, ethylene glycol or other inert water soluble antifreeze material and so forth.

Polymerization should preferably be conducted in a closed reactor, such as a pressure reactor, fitted with a stirrer or other agitating means, heating and cooling means, with means to flush with or pump in an inert gas such as nitrogen, helium, argon, neon and the like in order to polymerize preferably under inert or non-reactive conditions, with means to charge the monomers, water, catalysts and so forth, venting means, and with means to recover the polymer and so forth. The reactor should be cleaned or flushed out between polymerization runs to remove traces of shortstops, catalysts, modifier, residues and so forth which might interfere with subsequent polymerizations. There should be sufficient agitation or stirring of the polymerization media to ensure thorough mixing, diffusion, contact and so forth. All of the polymerization ingredients except the shortstop may be charged to the reactor at the same time, intermittently, incrementally or continuously. Also, the ingredients may be added separately or in a mixture.

Free radical aqueous emulsion copolymerization of dienes and vinyl monomers is well known to those skilled in the art. In this connection please see Bovey et al, "Emulsion Polymerization," Interscience Publishers, Inc., New York, 1955; Whitby et al, "Synthetic Rubber," John Wiley & Sons, Inc., New York, 1954; Schildknecht, "Vinyl and Related Polymers," John Wiley & Sons, Inc., New York, 1952 and "Encyclopedia of Polymer Science and Technology," Vol. 5 (1966), pages 801–859, Interscience Publishers, a division of John Wiley & Sons, Inc., New York.

The polymers made by the emulsion copolymerization process discussed above include not only random, linear, and branched copolymers and the like but also graft polymers. The technique of polymerizing or copolymerizing one or more monomers in the presence of a polymer or a substrate, "grafting technique," is known and is frequently called graft polymerization or graft copolymerization. In this connection, please see "Copolymerization," High Polymers, Vol. XVIII, Ham, pages 323–324, 335–420 and 573, Interscience Publishers a division of John Wiley & Sons, New York, 1964; "Block and Graft Polymers," Burlant and Hoffman, Reinhold Publishing Corporation, New York, 1960; "Block and Graft Copolymers," Ceresa, Butterworth & Co. (Publishers) Ltd., London, 1962; and "Graft Copolymers," Polymer Reviews, Vol. 16, Battaerd and Tregear, Interscience Publishers, a division of John Wiley & Sons, New York, 1967. Block copolymers, also, may be prepared in water by using certain azoamidino compounds which have surfactant properties and also act as free radical catalysts, optionally with an added emulsifying agent, as shown by U.S. Pat. No. 3,914,340.

While the above carboxylated latex or a mixture of the above latices can be used alone for the dip, it is preferred to employ a compounded latex. In other words, it is preferred to compound the latex with rubber fillers or extending agents along with the desired rubber stabilizers including chelating and/or sequestering agents, wetting or dispersing agents, suspending agents, defoamers, antisticking agents, antioxidants, bactericides, and the like to provide a stable, filled, compounded latex composition which has good covering power and which provides a nontacky, nonsticky or releasable, but adherent coating, film and/or layer on a hot tacky rubbery substrate when dried. Some latex compounding ingredients are shown by "Materials, Compounding Ingredients and Machinery for Rubber," "Rubber World" publication, 1977, Bill Communications, Inc., New York.

The fillers which are desirably added to the latex to extend it are nonblack, inorganic rubber compounding pigments or fillers. The fillers, also, may help as antisticking agents and may serve to thicken the latex as well as to modify the viscosity of the latex. The filler should be finely divided. Examples of fillers are calcium carbonate, clay, precipitated hydrated silica, fumed silica, mica, barytes, perlite, magnesium silicate or talc, feldspar, hydrous calcium magnesium silicate, magnesium carbonate, magnesium oxide, titanium dioxide, and the like and mixtures of the same. Of these materials it is preferred to use calcium carbonate, clay, fumed silica or hydrated precipitated silica and mixtures thereof. These fillers are used in an amount necessary to provide the desired extension, thickening, viscosity and/or additional anti-sticking properties for the latex and to reduce cost. Too large an amount should be avoided since the rubber particles of the latex (rubber dispersion or suspension) on drying will not be present in sufficient amount to form a film and to bind all of the filler particles together to the substrate. In general the amount of filler can vary from about 150 to 1,000 parts by weight per 100 parts by weight of dry copolymer (from the latex).

The other, as mentioned above, latex compounding ingredients (besides the pigments) are used in a minor amount by weight as compared to the copolymer (dry basis). They are desired (for example, in addition to any stabilizers, emulsifiers etc., used during polymerization) to further stabilize the latex in view of the addition of the fillers. These other compounding ingredients may provide more than one function in the latex, e.g., they may act as dispersing agents as well as wetting agents. In general, these other compounding ingredients such as stabilizers and wetting agents are used in an amount of from about 1 to 30 parts by weight per 100 parts by weight of the copolymer on a dry basis. Examples of some of these other latex compounding ingredients are anti-foaming or defoaming agents such as polyalkyleneether glycols, triols and tetrols, 2,4,7,9-tetramethyl-5- decyn-4, 7-diol, Defoamer Y-250 (blend of emulsifiable mineral oil, silica derivatives and esters, Drew Chemical Corp.), and the like. Examples of some stabilizing, dispersing and wetting agents are sodium linoleate, octylphenoxy polyethoxy ethanol, polyoxypropylene oxyethylene glycol, casein, alkyl aryl sulfonates, sodium dioctyl sulfosuccinate, sodium salt of polymerized alkyl naphthalene sulfonate, sodium stearate, and nonyl phenol and the like and mixtures thereof. Examples of some suspending and organic thickening agents are ammonium poly acrylate, sodium polyacrylate, hydroxyethyl cellulose, potassium alginate, polysaccharides, sodium alginate and the like and mixtures thereof. Examples of some antisticking agents are zinc stearate, saponified fatty acids and so forth.

The heat sensitizer is required so that the copolymer will form a film (coagulate or gel) at the desired temperature, e.g., on contacting the hot rubber stock. The heat sensitizer, also, acts to form (accelerate) a stronger film faster at a given temperature and thus reduces time of processing. Examples of heat sensitizers are the zinc ammine system, polyvinyl methylether, polypropylene glycol, 2-nitro-2-methyl-2-propanol and so forth. Polyoxy propylene oxyethylene glycols and similar alkylene oxide polyols, also, may act as heat sensitizers. The heat sensitizer is used in a minor amount by weight dry as compared to the polymer of the latex sufficient to gel or coagulate the polymer. Preferably, there are used about 0.75 to 15 parts by weight of the sensitizer to 100 parts by weight of the carboxylated polymer on a dry weight basis. Mixtures of heat sensitizers can be used.

A minor amount by weight (up to about 25% by weight on a dry weight basis) of the carboxylated latex may be replaced with other polymeric latices which are compatible with the carboxylated latex and the rubber stock to be dipped and which when mixed with the carboxylated latex do not cause the overall rubber mixture to have a combined glass transition temperature below about −30° C. Examples of such other latices are those of polybutadiene, polyisoprene, natural rubber, butadiene-styrene copolymer, butadiene-acrylonitrile copolymer, butadiene-styrene-acrylonitrile copolymer, butadiene-acrylic ester copolymer, polychloroprene, ethylene-propylene-diene copolymers (EPDM), isibutylene-isoprene copolymers, butadiene-styrene-vinyl pyridine copolymer, chlorobutyl rubber, bromobutyl rubber and so forth and mixtures thereof. Some of these polymers may be made of solution processes and then converted to emulsions by processes well known to the art.

For more information on methods of compounding and treating latex or latices see "Latex In Industry," Noble, 2nd Ed., 1953, Rubber Age, Palmerton Publishing Co., New York and "High Polymer Latices," Blackley, 1966, Vols. 1 and 2, Maclauren & Sons Ltd., London.

The amount of water used in making or added to the compounded latex will depend on the desired viscosity, handling characteristics of the compounded latex, the thickness of the film which it is desired to lay down on the rubber substrate and the time required for drying and film formation. Thin films and low viscosity compounded latices are desirable; however, these properties may vary considerably with needs, coating equipment, storing, pumping, speeds of coating, drying times and temperaturs, film thickness and so forth. In general, the total solids content in the aqueous compounded latex may be from about 10 to 75%, preferably from about 10 to 40%, by weight. Deionized or distilled water should be used as the diluent to avoid introducing extraneous ions which might cause instability in the latex, resulting film and so forth.

The compounded aqueous latex dip may be applied to the rubber substrate by dipping, spraying, roller coating, painting or by any means which will provide a suitable coating. Thin coatings are preferred since they will gel in a short time. On the other hand, while thick coatings may be used, only the surface layers nearest to or adjacent the rubber stock may be gelled in sufficient time so that the bulk of the coating may be washed off during the subsequent water (spray or dip) cooling step. Moreover, excess dip coating may require further compounding of the rubber stock itself to overcome the effects of the dip coating if the rubber compound is further mixed with curing agents such as sulfur and rubber accelerators. In general, not over about 7%, preferably not over about 2%, by weight dry of the dried latex composition from the dip on the rubber stock substrate will be enough to prevent sticking.

While the dip of the present invention can be applied to any polymeric surface and heated to prevent sticking of the surfaces, it is particularly applicable to rubber stocks which have been Banburyed, masticated, milled or which are freshly mixed and hot so that their surfaces are sticky or tacky. The stocks may be in the form of milled, masticated or broken down rubber, partially or fully compounded with carbon black, zinc oxide, stearic acid, silica, extender oil, styrenated phenol antioxidant and so forth. Examples of the rubber polymers which may be used in the stocks are natural rubber, polyisoprene, polybutadiene, butadiene-styrene copolymer, butadiene acrylonitrile copolymer, butadiene-styrene-acrylonitrile copolymer, butadiene-acrylic ester copolymer, polychloroprene, ethylene-propylene-diene copolymers (EPDM), isobutylene-isoprene copolymers (butyl), chlorinated butyl, brominated butyl, butadiene-styrene-vinyl pyridine copolymers, carboxylated butadiene-acrylonitrile copolymers, carboxylated butadiene polymers, carboxylated butadiene-styrene copolymers and the like and mixtures thereof. While the process of the present invention is particularly useful for treating hot rubber which has just been Banburyed and passed through a sheeting mill to form a continuous hot sheet or slab, it will be appreciated that it can apply to any milled, extruded, calendered, laminated or warmed, tacky rubber stocks to prevent the rubber stocks from sticking together when piled, shelved or stored awaiting subsequent processing, e.g., the manufacture of tires, belts and so forth. Moreover, while the dip of the present invention is useful with slab, strip or sheet rubber stock, especially in continuous form, it, also, can be used on separate pieces, formed or not, or in the form of powders, pellets, crumb or particles and so forth to prevent them from sticking together.

In one embodiment of the present invention the hot (about 90°–150° C.) masticated rubber stock from the Banbury is passed through a sheeting mill to form a continuous hot sheet or slab and the continuous hot slab is dipped in a dip tank containing the latex slab dip composition of this invention for about 1 second or so and is then allowed to air dry for 30 to 40 seconds or until at least about 80% of the water has evaporated (preferably all the water should evaporate) and the heat sensitizer in the latex has caused it to coagulate or gel. The gelled latex composition coated slab is then sprayed with water for about 30 to 40 seconds to cool it down without removing the latex coating and then air dried and stacked at a lay down temperature of about 50° C. maximum, preferably of about 45° C. maximum, (to prevent scorch) to form stacks or layers of rubber which do not stick together. During air drying step and water spraying step the rubber sheet or slab may be carried on a series of rotating shafts with long loops between the shafts (festooned) to save space.

Since the carboxylated latex may be sensitive to extraneous ions such as metallic cations which may cause it to coagulate or cause the precipitation of soaps, the dipping tank and piping, stirrers, pumps and so forth which may be used in connection with a dip tank should preferably contain a protective coating such as an epoxy resin, glass etc. and chelators and/or sequestering agents should preferably be added to the carboxylated latex dip etc. If stirring or agitating means are available and used continuously or when needed, filler suspended agents for the filled latex may not be necessary.

The following examples will serve to illustrate the present invention with more particularity to those skilled in the art. In the examples, parts are parts by weight unless otherwise indicated.

The mixing of the ingredients of the slab dip composition for the examples was done with a portable air or electric stirrer. The procedure is outlined below:

1. The latex was diluted with the predetermined amount of deionized water using moderate stirring.
2. The soap and wetting agents were added until they dissolved, the rate of solution depending on the nature of the materials and usually taking less than 5 minutes.
3. The heat-sensitizing additive was added.
4. The filler(s), wax emulsion and/or zinc stearate were added.
5. The polysaccharide thickener was added if used.
6. The defoamer was added if used.
7. Stirring was maintained until the latex dispersion appeared homogeneous.

The mixing procedure should not take longer than about 30 minutes for the batches shown in the working examples.

The viscosity of the slab dips was measured using the Brookfield viscometer. Model HB was used for high viscosity dips while model LV was used for the low viscosity dips. The rate of shearing and spindle type used were dictated by the nature of the dip. The slab dip formulation should be stable mechanically under conditions of high shear rate agitation. To establish this about 100 cc of the slab dip was stirred vigorously (3,300-3,500 rpm) using a "milk shake" type apparatus while observing for a change in the slab dip.

pH determination of the slab dips were made by means of pH indicating paper strips.

Rubber compounds or samples used to test the slab dips included masticated natural rubber gum stocks and masticated natural rubber-carbon black filled stocks, both milled in the laboratory prior to dipping to provide a hot fresh rubber surface.

Then the freshly milled rubber samples were dipped in a bath of the latex slab dip composition for about 1 second, dried in air at about 25° C. for about 30 seconds, cooled in water at about 25° C. for 30 seconds, and then dried in air for 60 seconds and stacked.

The stacked rubber layers (stacking) was made to simulate conditions in production. Two samples coated with the dried gelled slab dip were stacked on top of each other and about 2 psi was applied using a special bladder mold in a press. The press was heated to about 54.5° C. Samples were treated this way for as long as three days before they were taken out for observation. The conditions of simulated stacking are actually much more severe than in production. In production a regular batch weighing about 1800 lbs., when folded and stacked in the normal way, probably experiences about 1 psi of pressure, particularly those confined to the bottom of the stack. The temperature of the stock during laydown is not supposed to exceed about 50° C.

EXAMPLE I

The following ingredients were mixed together to form slab dips having a total solids content (TSC) of over 50% as shown in Table I below:

TABLE I

| Ingredients | Parts by Weight | | |
|---|---|---|---|
| | Run 1 | Run 2 | Run 3 |
| Latex | 100 | 100 | 100 |
| "Valpro" SD | 1.5 | 1.5 | 1.5 |
| "Pluronics" L101 | 1.5 | 1.5 | 1.5 |
| Sodium lauryl sulfate | 1.0 | 1.0 | 1.0 |
| Kaolin clay | — | — | 150 |
| Whiting | 300 | 300 | — |
| "Cab-O-Sil" M5 | 2.5 | 2.5 | — |
| NMP | 1.5 | — | 1.5 |
| 2.5% "Kelzan" aqueous solution | — | 10 | — |
| "Surfynol" 104H | — | — | 0.5 |
| Water (deionized) | 100 | 100 | 150 |
| Total | 508.0 | 516.5 | 406.0 |
| % TSC, by weight of dip | 70.6 | 69.2 | 50.9 |
| % Rubber, dry basis, by weight in dip | 14.1 | 14.2 | 24.6 |
| % Rubber, wet basis, by weight in dip | 10.0 | 9.8 | 12.5 |

On standing overnight, the whiting in slab dip Run 1 settled out due to lack of suspending agent while Run 2 and Run 3 remained homogeneous. The incorporation of a polysaccharide ("Kelzan") in Run 2 effectively maintained the filler in suspension. Run 3, on the other hand, had a much lower total solids content than Run 1. The type of filler used, also, was different in both cases. The mechanical stability of the above dips was excellent. When subjected to vigorous stirring for more than 30 minutes, very little change in viscosity was observed. Foaming was, however, extensive in all cases but collapse of the foams occurred in 10-30 minutes after stirring had ceased.

When freshly masticated hot natural rubber samples (gum and black loaded) were immersed in the dips, heavy coatings were obtained due to the high solids content. The viscosity of the above dips were all about 3000 cps, based on an HB model Brookfield viscometer with a number 2 spindle and 10 rpm. Subsequent spraying with water washed off part of the dips, leaving fairly thin continuous coatings on drying. The coated samples did not stick together in the heated bladder mold test. The dried coatings were not removed on treatment with water.

The stability of these latex dips, when exposed to a sandblasted steel panel, was poor. Destabilization obviously occurred after exposure overnight as indicated by the thick deposit on the surfaces of the panel. This problem was eliminated when a similar steel panel was coated with an epoxy based paint prior to exposure to the slab dips.

EXAMPLE II

The following ingredients were mixed together to form slab dips having varying TSC as shown in Table II, below:

TABLE II

| | Parts By Weight Run No. | | | | |
|---|---|---|---|---|---|
| Ingredients | 10 | 11 | 12 | 13 | 14 |
| Latex | 100 | 100 | 100 | 100 | 100 |
| "Valpro" SD | 1.0 | 1.0 | 1.0 | 1.0 | 1.0 |
| "Triton" X-114 | 0.5 | 0.5 | 0.5 | 0.5 | 0.5 |
| "Kelzan" | 0.25 | 0.25 | 0.25 | 0.25 | 0.25 |
| Whiting | 275 | 275 | 275 | 275 | 275 |
| "Cab-O-Sil" EH5 | 5 | 5 | 5 | 5 | 5 |
| NMP | 2 | 2 | 2 | 2 | 2 |
| Deionized water | 285.4 | 359.7 | 452.6 | 572.1 | 731.4 |
| Total | 669.15 | 743.45 | 836.35 | 955.85 | 1115.15 |
| % TSC, by weight | 50 | 45 | 40 | 35 | 30 |
| % Rubber (wet), by weight | 7.6 | 6.8 | 6.0 | 5.3 | 4.6 |
| % Rubber (dry), by weight | 15 | 15 | 15 | 15 | 15 |

The above dips were then evaluated for coating efficiency or behavior and for viscosity. Uncured (carbon black loaded natural rubber) tire compounds die-cut into 1"×6"×¼" specimens were accurately weighed and heated prior to dipping and drying. After spraying with water and final drying, the dipped specimens were reweighed to obtain the coating retained. The results are summarized in Table II, A, below:

TABLE II, A

| Slab Dip Run No. | 10 | 11 | 12 | 13 | 14 |
|---|---|---|---|---|---|
| Brookfield Visc. centipoise HB Model, Spindle #1 10 rpm | 105 | 50 | 30 | 15 | <10 |
| Deposit on rubber specimens, % by wt. | 3.9 | 2.3 | 1.65 | 0.95 | poor wetting |

The weight of the rubber specimens used averaged 16.56 grams with deviations from this average of no more than 5%. It was apparent from the results shown that the deposit from the slab dips increases with increasing total solids content. An ideal dip would be one which works with the least amount of deposit from a cost standpoint. Inadequate wetting becomes a problem with increasing dilution. However, this can easily be circumvented by adjusting the amount of wetting agent accordingly. The increase in viscosity with increasing TSC is rather expected. The surfaces of the dried latex coated samples of Runs 10 to 13 were not tacky, and, also, the dried coatings were not removed on washing or rinsing in water. The wetting of Run 14 could be increased by adding more surfactant or wetting agent.

EXAMPLE III

The following ingredients were mixed together to form slab dips having constant TSC by keeping the latex content constant and by varying the whiting content and the water content as shown in Table III, below:

TABLE III

| | | Parts By Weight Run No. | | |
|---|---|---|---|---|
| Ingredients | | 20 | 21 | 22 |
| Latex | | 100 | 100 | 100 |
| "Valpro" SD | | 1.0 | 1.0 | 1.0 |
| "Triton" X-114 | | 0.5 | 0.5 | 0.5 |
| "Kelzan" | | 0.25 | 0.25 | 0.25 |
| Whiting | | 275 | 210 | 185 |
| "Cab-O-Sil" EH5 | | 5 | 5 | 5 |
| NMP | | 2 | 2 | 2 |
| Water | | 452.6 | 355 | 317.6 |
| | Total | 836.35 | 673.75 | 611.35 |
| % TSC, by weight | | 40 | 40 | 40 |
| % Rubber (dry), by wt. | | 15 | 18.8 | 20.7 |
| % Rubber (wet), by wt. | | 6 | 7.5 | 8.3 |
| Brookfield Viscosity Model HB Spindle #1, 10 rpm | | ~30 | ~40 | ~25 |
| Deposit of latex compound on rubber % by wt. | | 1.65 | 1.40 | 1.25 |

In contrast to previous examples, the amount of slab dips deposited on hot and dried carbon black filled natural rubber sample stocks appears to decrease with increasing rubber content. Closer examination of the formulations showed that the effect of the rubber content was actually confounded with the differences in the whiting level. The increase in rubber content was obtained at the expense of decreasing whiting level. Hence, the decrease in the amount of dip deposit with increasing rubber content may in some way be related to the decrease in the whiting level. The slab dips in Tables II plus II A and III, except Run 14 in Tables II plus II A, effectively prevented the rubbers from sticking in the bladder mold test. Based on the results of these examples, decreasing the solids content does not impair the slab dip performance. The surfaces of the dried latex coated rubber samples of this Example were not sticky nor tacky, and, also, after drying the surface films or coatings were not removed by treatment with water.

EXAMPLE IV

In this example relatively low TSC slab dips were prepared in which were dipped natural rubber gum stocks or compounds as well as carbon black filled natural rubber stocks. The dried latex coated rubber samples were tested according to the bladder mold test mentioned above and all of the dried latex coated rubber samples of the runs of this example did not stick together, and even though the surface films were thin, they were uniform. Moreover, after drying, these surface films on the rubber stocks were not removed by water. The ingredients of the dips are shown in Table IV, below:

TABLE IV

| | | Parts by Weight Run No. | | | |
|---|---|---|---|---|---|
| Ingredients | | 30 | 31 | 32 | 33 |
| Latex | | 100 | 100 | 100 | 100 |
| "Valpro" SD | | 2.5 | 2.5 | 2.5 | 2.5 |
| "Triton" X-114 | | 3.0 | 3.0 | 3.0 | 3.0 |
| Whiting | | 430 | 430 | 430 | 450 |
| "Hi-Sil" 215 | | 15 | — | 15 | — |
| Emulsion | | — | — | 15 | — |
| Zinc stearate | | — | — | — | 5.0 |
| "Gantrez" M-154 | | 4.0 | 5.0 | 4.0 | 3.0 |
| Deionized water | | 1972 | 1916 | 2032 | 2008 |
| | Total | 2526.5 | 2456.5 | 2601.5 | 2571.5 |
| % TSC, by wt. | | 20 | 20 | 20 | 20 |

TABLE IV-continued

| | Parts by Weight Run No. | | | |
|---|---|---|---|---|
| Ingredients | 30 | 31 | 32 | 33 |
| % Rubber (dry), by wt. | 10.05 | 10.3 | 9.8 | 9.9 |
| % Rubber (wet), by wt. | 2.01 | 2.07 | 1.95 | 1.98 |

The emulsion contained the following ingredients in parts by weight:

| "Epolene" E-15 | 40 |
|---|---|
| "Triton" X-114 | 13 |
| 43% KOH in deionized water | 1.3 |
| Deionized water | 150 |
| Total | 204.3 |

The emulsion was prepared by first melting the "Epolene" at about 130° C., in the presence of the "Triton" and then slowly adding the KOH solution. The mixture was stirred until bubbling stopped. It was then reheated back to about 130° C., before final blending, with vigouous stirring, into the boiling water. The stirring was maintained until the emulsion cooled to about 45° C.

The pH of the dips of this example ranged from 8.2 to 8.4. The heat sensitizer, "Gantrez", is most effective at a pH of about 8 although at a pH of above about 8 the compounded latex can become marginal in stability unless amply stabilized. The wetting agents in appreciable amounts are necessary to get good wetting at high filler loading (note Run 14).

With respect to the dips of the runs of this example all were vigorously stirred (3,300-3,500 rpm) between one half to about one hour using a milk shake type apparatus without any observable change in their appearance showing that they were resistant to destabilization at high speed agitation even at relatively low pH. Although foaming occurred in all instances due to air entrapment, the foams collapsed on standing. The dips of the runs of this example were aged in closed containers in an oven at 50° C., without any observed change after three weeks. Thus the dips can be stable to the pumping, stirring, and temperatures which might be encountered in storage and in dipping during tire factory operations.

Using a Brookfield Model LV viscometer with a #1 spindle rotating at 30 rpm the viscosity of all of the dips of this example was less than 10 centipoises.

Specimens of uncoated steel panels were immersed in the slab dips of this example, and no change was observed after the first 3 days. Later some green deposits started to appear on the steel and the pH of the dips was found to be reduced from above 8 as shown above to slightly above 7. In contrast to these observations there was no apparent change in the physical state of painted steel panels when immersed in these dips, and the pH of the dips was unchanged after immersion for a week.

A rubber slab (natural rubber-carbon black masterbatch) was dipped in a slab dip the same as Run 31 above but at a somewhat higher total solids content, dried and cooled. The coated slab and a similar uncoated slab were separately mixed, based on 100 parts by weight of the rubber slab, with 5 parts of zinc oxide, 2 parts of stearic acid, 0.5 part of MBT, and 2.5 parts of sulfur. The resulting compounded slabs were then each molded, cured and tested. The results are shown in Table IV, A below:

TABLE IV, A

| | Slab + Dip of Run 31 | Slab Without Dip |
|---|---|---|
| Cure at 141.7° C. | 14 min. | 14.5 min. |
| 10% Modulus, MPa | 0.62 | 0.59 |
| 100% Modulus, MPa | 3.52 | 3.40 |
| 300% Modulus, MPa | 12.82 | 12.35 |
| Tensile, MPa | 15.63 | 18.31 |
| Elongation, % | 355 | 420 |
| Shore A, hardness | 72 | 71 |
| Trouser Tear, kN/m | 3.01 | 2.92 |

With the exception of the tensile strength and elongation, the two cured compounds appear to have essentially the same properties. The differences in tensile strength and elongation are not significant and generally are within the experimental error normally expected for these properties. These tests show that the coating on the slab does not materially affect the cured properties of the rubber. Of course, allowance in compounding for these differences may narrow and eliminate the same.

A run was made using the same dip as Run 31 but with a slightly higher concentration of whiting. The rubber stock was milled, calendered and extruded as a tire puncture sealing strip and passed through the dip, dried, cooled with water, dried and piled up on itself or stacked. After several hours (overnight), it was inspected and the lengths or strips of the coated rubber puncture sealant compound could readily be separated from each other or unstacked. The puncture sealant is of a type which flows excessively in storage. This experiment indicates the importance of compliance and retention of film contiguity that the film from the present slab dip possesses since a non-film forming dip would not work in the case of such a rubber compound which was an oil extended ethylene-propylenediene monomer rubber composition (see U.S. Pat. No. 3,903,947).

EXAMPLE V

A natural rubber carbon black masterbatch compound was cut into pellets or cubes approximately ¼" in size. Four lots of these pellets each weighing about 25 grams were loosely put in a steel mesh container and dipped in various dips and dried for 1-2 minutes, the rubber samples being accurately weighed to the nearest 0.1 mg before and after coating. The samples were then transferred to their respective graduated cylinders measuring about 12" long × 1.5" diameter to simulate storage bins. On top of the rubber pellets was added a metal dish and then there were added lead beads on top of the dish which thus separated the pellets from the beads. The dish and beads together exerted about 2.4 p.s.i., of pressure on the rubber pellets. The entire assemblies were then aged in a heated oven at about 45° C., for four days. After this period the rubber pellets were taken out for observation. The data are shown below:

V-1. Control No. dip nor coating. The pellets adhered together forming a solid mass in the shape of the cylinder.

V-2. Rubber pellets not heated prior to dipping. Dip was clay suspension or slurry (10% TSC) in water containing surfactant. 0.69% by weight of dip coating on rubber pellets picked up on drying. Coated pellets did not stick together.

V-3. Rubber pellets not heated prior to dipping. Dip was zinc stearate (not readily water dispersible, "Quikote," Ventron Corp.) slurry (10% TSC) in water. 0.13% by weight of dip coating on rubber pellets picked up on drying. Coated pellets did not stick together.

V-4. Rubber pellets heated above about 70° C. with a hotair blow gun before dipping. Dip was the dip of Example IV, Run 31, above. 0.45% by weight of dip coating on rubber pellets picked up on drying. Coated pellets did not stick together.

The following comments can be made:

V-2. This dip not only deposited more solids on the rubber which can adversely affect vulcanizate properties for some applications, but it is readily removed by water washing.

V-3. While this dip deposited less solids on the rubber stock than the dip of V-4, it is about 6 times more expensive than the dip of V-4 even at the lower solids deposit. While zinc stearate is water insoluble, it apparently adheres to the rubber because of its fine particle size and of its density being low, e.g., lower than the clay.

Example VI

The following ingredients were mixed together to form a slab dip as shown below:

| Ingredient | Parts By Weight |
|---|---|
| Latex | 100 |
| Aluminum silicate, hard clay | 430 |
| "Valpro" SD | 3 |
| "Sequestrene" NA3 | 0.5 |
| "Lubrex" PE-40 | 12 |
| "Triton" X-114 | 4 |
| NMP | 2 |
| Y-250 | 0.1 |
| Deionized Water | 1915 |
| Total Solids content of | 20% by weight |
| Rubber wet basis | 2.0% by weight |
| Rubber dry basis | 10.1% by weight |

Hot masticated rubber was surface treated with this dip and dried. Subsequent spraying with water to cool the rubber did not remove the dip. Following the water spray to cool the rubber, it was dried and formed into layers (stacked). The rubber of the layers could readily be separated without sticking.

In summary, slab dips have been disclosed which when deposited on the surface of rubber compounds, become resistant to removal by water spray. The dips are based on a carboxylated polymer latex and a heat sensitizer and preferably contain suitable wetting agents, stabilizers and fillers. The high temperature of the freshly-mixed rubber compound causes the slab dip to form an adherent, nontacky water resistant film. The film deposited on the rubber compounds effectively prevents the layers of rubber from sticking during stacking and storage. The dips are low in cost and are easy to prepare. The rubber compound containing the film from the dip can be reprocessed easily with no adverse affect on the final vulcanizate properties based on laboratory tests. NOTES:

Latex of Examples I to V—Aqueous emulsion free radical polymerized high molecular weight carboxylated butadiene-styrene copolymer containing about 55% by weight styrene, not over about 5% by weight total of methacrylic and itaconic acids and the balance butadiene-1,3. Polymer Tg of about −20° C., about 50% solids, pH of 9.0, Brookfield viscosity (#2@ 60 LVF) of 70, and surface tension of 54.0. Contains antioxidant. Binder and film former.

Latex of Example VI—Aqueous emulsion free radical polymerized high molecular weight copolymer of about 64% by weight of styrene, about 2% by weight total of a mixture of itaconic acid and methacrylic acid, and the balance butadiene—1,3. About 50% by weight solids, pH of 9. Brookfield LVF viscosity #2@ 60 of 60 to 90. Tg of about—15.9° C. by Differential Thermal Analysis and Tg of about—10.2° C. by Differential Scanning Calorimetry.

"Valpro" SD—Sodium linoleate. 94% min. anhydrous soap. Valley Products Co. Used as stabilizing, dispersing and wetting agent.

"Pluronic" L 101—Liquid polyoxypropylene—oxyethylene glycol. A nonionic difunctional blockpolymer terminated in primary hydroxyl groups. Av. mol. wt. of 3800. BASF Wyandotte. Used as wetting agent and possible heat sensitizer.

Kaolin—China clay. Hydrated alumina silicate. J. M. Huber. Used as filler and anti-sticking agent.

Whiting—Calcium carbonate. Natural ground. Sp. gr. 2.71 Mean particle size (microns), 13.0. CC100, Sylacauga Calcium, Alabama. Used as filler and anti-sticking agent.

"Cab-O-Sil" M-5—Fumed silica. Surface area (BET) $200\pm25$ m$^2$/gm; particle size 0.012 micron. Cabot Corp. Used as viscosity modifier and filler.

NMP—2-Nitro-2-methyl-1-propanol. Water max. 0.5% by wt. Free formaldehyde max. 0.04% by wt. Melting point min. 80° C. IMC Chemical Group, Inc. Used as heatsensitizing additive.

"Kelzan"—Xanthan gum, a high molecular weight (about over one million) generally linear complex polysaccharide. Kelco Company. Used as filler suspending agent.

"Surfynol" 104H—75% wt. 2,4,7,9-tetramethyl-5-decyn-4,7-diol in ethylene glycol. Air Products and Chemicals Inc. Used as defoamer.

"Triton" X-114—An alkyl aryl polyether alcohol; the adduct of to-octyl phenol and 7-8 ethylene oxide groups. Rohm & Haas Company. Used as wetting agent.

"Cab-O-Sil" EH-5—Fumed (vapor phase) silica. Surface area (BET) $390\pm40$ m$^2$/gm. Density 2.3 lbs./cu. ft. Nominal particle size 0.007 micron. Ignition loss (1000° C., moisture-free basis) 2.5%. Cabot Corp. Used as viscosity modifier and filler.

"Hi-Sil" 215—Compacted, precipitated, hydrated silica. Sp. gr. 2.0. Ultimate particle size 0.002 micron. Finer than 325 mesh. PPG Industries, Inc. Used as thickening agent and filler.

"Gantrez" M-154—50% water solution of linear homopoly (vinyl methyl ether); K-value 40; specific viscosity (1 g/100 ml benzene)0.47. GAF Corp. Used as heat sensitizating additive.

"Epolene" E-15—Polyethylene. Emulsifiable. Approximate molecular weight of 3400. Density at 25° C., of 0.925. Acid No. 16. Brookfield viscosity, spindle #3,6 rpm, at 125° C., of 520 cp. Eastman Kodak Co.

MBT—2-mercaptobenzothiazole.

Zinc stearate—wettable. Dispersible in water. C. P. Hall.

"Sequestrene" NA3—Trisodium ethylene diamine tetra acetate dihydrate. Chelating agent. Ciba-Geigy Corp.

"Lubrex" PE-40—30% emulsion of polyethylene in water. Harwick Chemical.

Y-250—Defoamer. Specific gravity of 0.91-0.93; boiling point of 295° F.; flash point of >250° F.; COC; water dispersible; blend of mineral oils, silica derivatives and esters in emulsion. Drew Chemical Corp.

The embodiments of the invention in which an exclusive property or privilege is claimed are defined as follows:

1. A composition of matter comprising a compounded aqueous polymeric latex containing a carboxylated copolymer having a glass transition temperature of not less than about −30° C., and in which said copolymer consists essentially of a carboxylated copolymer of (1) at least 45% by weight of a monomer selected from the group consisting of styrene, vinyl toluene, acrylonitrile, methacrylonitrile, acrylamide, methacrylamide, methylmethacrylate and ethylmethacrylate and mixtures thereof, (2) a copolymerizable monomer selected from the group consisting of acrylic acid, meethacrylic acid, ethacrylic acid, maleic acid, fumaric acid, itaconic acid, citraconic acid, sorbic acid and crotonic acid and mixtures thereof in an amount of up to 10% by weight and (3) the balance in an amount sufficient to provide some flexibility to and for vulcanization of the copolymer, a copolymerizable monomer selected from the group consisting of butadiene-1,3, isoprene, 2,3-dimethyl-butadiene-1,3 and piperylene and mixtures thereof, said latex being compounded with from about 150 to 1000 parts by weight of inorganic, nonblack rubber compounding pigments per 100 parts by weight of said copolymer in said latex, from about 1 to 30 parts by weight of rubber stabilizers and wetting agents per 100 parts by weight of said copolymer in said latex and a heat sensitizer for said copolymer in said latex in an amount of from about 0.75 to 15 parts by weight per 100 parts by weight of said copolymer in said latex, said heat sensitizer being selected fom the group consisting of the zinc ammine system, polyvinylmethylether, polypropylene glycol, 2-nitro-2-methyl-1-propanol and polyoxypropylene oxyethylene glycol and mixtures thereof, the total solids content of said latex being from about 10 to 75% by weight and said composition characterized in being able to provide a hot, sticky rubber compound with an adherent water resistant coating or film so that the rubber can be water cooled and dried and assembled or stacked without sticking.

2. A composition according to claim 1 in which the total solids content of said compounded aqueous polymeric latex is from about 10 to 40% by weight.

3. A composition according to claim 2 in which the copolymer of said latex is a copolymer of about 55% by weight of styrene, not over about 5% by weight total of a mixture of methacrylic acid and itaconic acid and the balance butadiene-1,3, said copolymer having a glass transition temperature of about −20° C.

4. A composition according to claim 2 in which the copolymer of said latex is a copolymer of about 64% by weight of styrene, about 2% by weight total of itaconic acid and methacrylic acid and the balance butadiene-1,3, said copolymer having glass transition temperatures of about −15.9° C. by Differential Thermal Analysis and of about −10.2° C. by Differential Scanning Calorimetry.

5. A composition according to claim 1 containing additionally a chelating agent.

* * * * *

UNITED STATES PATENT AND TRADEMARK OFFICE
CERTIFICATE OF CORRECTION

PATENT NO. : 4,436,857
DATED : March 13, 1984
INVENTOR(S) : Tiong Ho Kuan et al

It is certified that error appears in the above-identified patent and that said Letters Patent are hereby corrected as shown below:

Column 17, line 18, which reads: "mee-" should read ---me- ---.

Signed and Sealed this

Third Day of July 1984

[SEAL]

Attest:

GERALD J. MOSSINGHOFF

Attesting Officer  Commissioner of Patents and Trademarks